United States Patent [19]

Inoue

[11] Patent Number: 4,789,237
[45] Date of Patent: Dec. 6, 1988

[54] DEVICE FOR SELECTING A LIGHT SOURCE FOR MEASURING THE WAVELENGTH CHARACTERISTICS OF AN OPTICAL ELEMENT

[75] Inventor: Koui Inoue, Tokyo, Japan

[73] Assignee: Ando Electric Co., Ltd., Tokyo, Japan

[21] Appl. No.: 928,501

[22] Filed: Nov. 7, 1986

[30] Foreign Application Priority Data

Nov. 29, 1985 [JP] Japan ................................ 60-268781

[51] Int. Cl.⁴ ......................... G01N 21/00; G01D 5/34
[52] U.S. Cl. .................................. 356/73.1; 250/231 R
[58] Field of Search .............................. 356/73.1, 416; 250/231 R

[56] References Cited

U.S. PATENT DOCUMENTS

| | | | |
|---|---|---|---|
| 4,257,707 | 3/1981 | Liertz et al. ........................ | 356/73.1 |
| 4,356,448 | 10/1982 | Brogardh et al. .......... | 250/231 R X |
| 4,551,019 | 11/1985 | Vella et al. ........................ | 356/73.1 |
| 4,673,299 | 6/1987 | Dakin ................................ | 356/73.1 |

Primary Examiner—Eugene R. LaRoche
Assistant Examiner—Nathan W. McCutcheon
Attorney, Agent, or Firm—Flynn, Thiel, Boutell & Tanis

[57] ABSTRACT

A device for selecting a light source among a plurality of light sources, for measuring the wavelength characteristics of an optical element comprises: a signal source which generates a modulating signal; a change-over switch connected to the signal source; a plurality of light sources different from each other in wavelength, connected to the outputs of the change-over switch; a coupler coupling the respective outputs of the light sources; a detector for detecting the respective outputs of the light sources; a filter which passes only a component of the output of the detector corresponding to the modulated optical output of a selected light source; and an indicator for indicating the measured wavelength characteristics of a measured optical element. The change-over switch is operated to selectively connect the signal source to a selected light source to modulate the optical output of the selected light source by the modulating signal of the signal source. The optical output of the detector is filtered by the filter to pass only a component corresponding to the modulated optical output of the selected light source.

3 Claims, 1 Drawing Sheet

DEVICE FOR SELECTING A LIGHT SOURCE FOR MEASURING THE WAVELENGTH CHARACTERISTICS OF AN OPTICAL ELEMENT

BACKGROUND OF THE INVENTION

1. Field of the Invention

The present invention relates to a device for selecting a light source for measuring the wavelength characteristics of an optical element, which modulates the optical output of a light source among a plurality of light sources which provide optical outputs of different wavelengths, respectively, by applying a modulating signal to the light source, and detects the modulated optical output to measure the wavelength characteristics of an optical element, such as an optical fiber.

2. Description of the Prior Art

The constitution of a conventional device for measuring the wavelength characteristics of an optical element such as an optical fiber is shown in FIG. 2. In FIG. 2, indicated at 7 is a measured optical element, at 11A and 11B are light sources, at 12A and 12B are connectors, at 13 is a connector and at 14 is an indicator. The light sources 11A and 11B are different from each other in the wavelength of optical output. The number of the light sources need not be limited to two, but may be increased when necessary. The connectors 12A and 12B are connected to the respective outputs of the light sources 11A and 11B, respectively. The connector 13 and the indicator 14 are connected to the input and the output of the optical element 7, respectively. The indicator 14 indicates the measured wavelength characteristics of the optical element 7. When the connector 12A is connected to the connector 13, the optical output of the light source 11A is applied to the optical element 7 and the optical output level of the optical element 7 is indicated on the indicator 14.

When the light source 11A is required to be replaced with the light source 11B to apply the optical output of the lightsource 11B to the optical element 7, the connector 12A needs to be disconnected from the connector 13 and the connector 12B needs to be connected to the connector 13. Accordingly, additional time is required for measurement. Furthermore, when the distance between the extremity of the connector 12A and that of the connector 13 and the distance between the extremity of the connector 12B and that of the connector 13 are different from each other, the connection loss is variable, and hence accurate measurement is impossible.

SUMMARY OF THE INVENTION

Accordingly, it is an object of the present invention to provide a device for selecting a light source among a plurality of light sources different from each other in wavelength for measuring the wavelength characteristics of an optical element without changing the connection of the connectors of the light sources to the connector of the measuring unit.

According to the present invention, a plurality of light sources are connected through a coupler to a wavelength characteristics measuring unit, the optical output of the selected light source among a plurality of light sources is modulated, the output of the coupler is applied to a measured optical element, and only the modulated optical output is detected to measure the wavelength characteristic of the optical element.

The above and other objects, features and advantages of the present invention will become more apparent from the following description when taken in conjunction with the accompanying drawing.

DESCRIPTION OF THE PREFERRED EMBODIMENT

Figure 1:
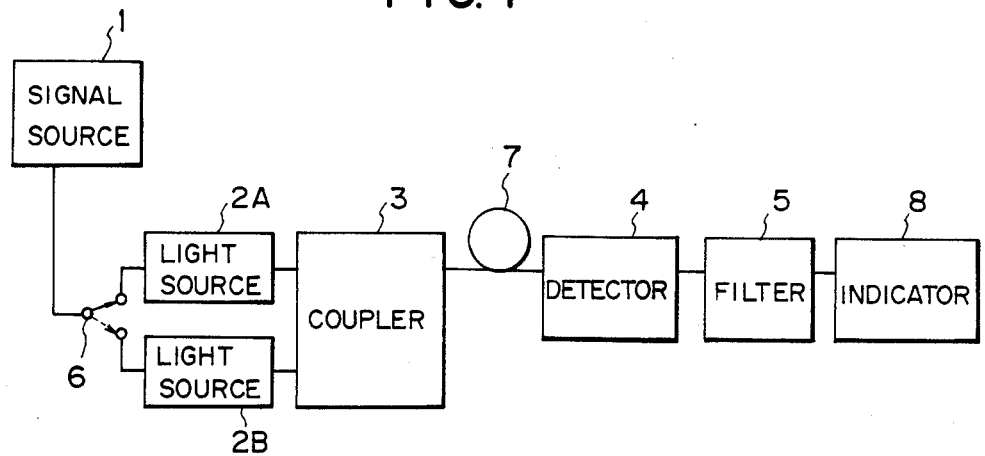
FIG. 1 is a block diagram showing the constitution of a device, in a preferred embodiment, according to the present invention.
Figure 2:
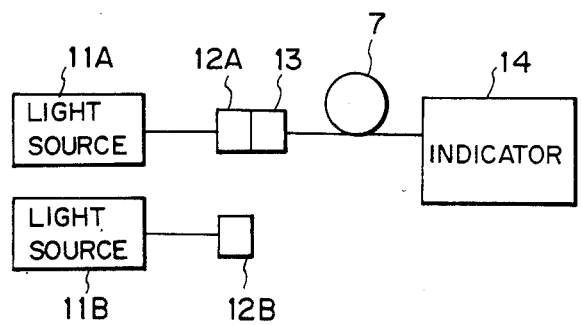
FIG. 2 is a block diagram showing the constitution of a conventional device for measuring the wavelength characteristics of an optical element.

Referring to FIG. 1, there are shown a signal source 1, light sources 2A and 2B, a coupler 3, a detector 4, a filter 5, a change-over switch 6 and an indicator 8.

The signal source 1 provides a modulating signal. In this embodiment, the modulating frequency of the modulating signal is 270 Hz.

The light sources 2A and 2B are different from each other in the wavelength of optical output. More than two light sources may be provided when necessary.

The coupler 3 combines the optical outputs of different wavelengths of the light sources 2A and 2B and provides a composite optical output.

The detector 4 detects the modulated optical output of the selected light source. The filter 5 passes the modulated optical output modulated by the modulating signal of the signal source 1. The indicator 8 indicated the measured wavelength characteristics of the optical element 7.

The change-over switch 6 connects the signal source 1 to either the light source 2A or the light source 2B. Both the light sources 2A and 2B are connected to the input of the coupler 3. The output of the coupler 3 is applied to the optical element 7. The input and the output of the filter 5 are connected to the output of the detector 4 and to the indicator 8, respectively.

Suppose that the signals source 1 is connected through the change-over switch 6 to the light source 2A to modulate the optical output of the light source 2A by the modulating signal of the signal source 1. Then, the modulated optical output of the light source 2A and the optical output of the light source 2B, namely, a continuous light wave, are given to the coupler 3. The coupler 3 combines the modulated optical output of the light source 2A and the continuous optical output of the light source 2B to provide a composite optical output. Consequently, a superposed light signal of the continuous light and the modulated light is applied to the optical element 7 and the optical output of the optical element 7 is detected by the detector 4. The output signal of the detector 4 is filtered by the filter 5 to pass only the component corresponding to the modulated optical output of the light source 2A modulated by the modulating signal of the signal source 1. The optical output of the filter 5 is indicated on the indicator 8.

Thus, according to the present invention, the optical output of one light source among a plurality of light sources is modulated by the modulating signal of a signal source, the modulated optical output is applied together with the optical outputs of the rest of the light sources to the optical element, and the optical output of the optical element corresponding to the modulating signal of the signal source is detected and selected by the detector and the filter. Accordingly, the present invention enables the measurement of the wavelength characteristics of the optical element without requiring any operation for changing the connection of connectors.

Although the invention has been described in its preferred form with a certain degree of particularity, it is to be understood that many changes and variations are possible in the invention without departing from the scope and spirit thereof.

What is claimed is:

1. A device for selecting a light source among a plurality of light sources, for measuring the wavelength characteristics of an optical element, which comprises:
    (a) an electric modulating signal source which generates an electric modulating signal of desired frequency;
    (b) an electric signal change-over switch having an input connected to the output of the electric modulating signal source;
    (c) a plurality of light sources respectively having inputs connected to the outputs of the electric signal change-over switch and capable of providing optical outputs different from each other in wavelength, said electric signal change-over switch having means switchable to one setting for connecting said electric modulating signal source alternately to different ones of said plurality of light sources and therewith modulating the light output of the connected one of said light sources to produce a light output therefrom modulated at said desired frequency while a second said light source produces a continuous light output;
    (d) means defining an optical coupler for combining the respective light outputs of the optical sources and having a light output through which the combined modulated and nonmodulated light outputs of the light sources are applied to a measured optical element;
    (e) a detector for detecting, and producing an electric signal representing, the combined light outputs of the light sources as taken from said measured optical element, said detector having an light signal input connected to the light output of the measured optical element and having an output;
    (f) a filter having an electric signal input connected to the electric signal output of the detector, to pass only the part of the output of the detector corresponding to the modulated optical output while not passing the part of the output of the detector corresponding to the continuous optical output; and
    (g) an indicator for indicating the measured wavelength characteristics of the optical element, said indicator having an input connected to the output of the filter, said electric signal change-over switch means having a second setting in which the optical output of said second light source is modulated by the modulating signal of the modulating signal source while said one light source produces a continuous light output.

2. The apparatus of claim 1 in which said switch is a conventional single pole, double throw electric switch for switching an electric signal.

3. The apparatus of claim 1 in which said light sources connect in parallel to each other between said switch and optical coupler, said coupler directly connecting to said measured optical element without interposed optical switching.

* * * * *